US 12,276,350 B2

(12) United States Patent
Verissimo

(10) Patent No.: US 12,276,350 B2
(45) Date of Patent: Apr. 15, 2025

(54) RETROFITTED FLOOD IRRIGATION VALVE ACTUATING APPARATUS

(71) Applicant: Austin Verissimo, Modesto, CA (US)

(72) Inventor: Austin Verissimo, Modesto, CA (US)

( * ) Notice: Subject to any disclaimer, the term of this patent is extended or adjusted under 35 U.S.C. 154(b) by 269 days.

(21) Appl. No.: 17/969,483

(22) Filed: Oct. 19, 2022

(65) Prior Publication Data
US 2023/0042418 A1 Feb. 9, 2023

Related U.S. Application Data

(63) Continuation-in-part of application No. 17/215,825, filed on Mar. 29, 2021.

(51) Int. Cl.
*F16K 31/04* (2006.01)
*E02B 13/02* (2006.01)

(52) U.S. Cl.
CPC ............ *F16K 31/047* (2013.01); *E02B 13/02* (2013.01)

(58) Field of Classification Search
CPC .................................. F16K 31/047; E02B 13/02
See application file for complete search history.

(56) References Cited

U.S. PATENT DOCUMENTS

| | | | | |
|---|---|---|---|---|
| 93,222 A * | 8/1869 | Palmer | ............... | F16K 31/52408 251/253 |
| 340,689 A * | 4/1886 | Waters | ................ | B60K 7/0015 91/215 |
| 386,313 A * | 7/1888 | Green | ................... | E04G 23/006 299/71 |
| 494,007 A * | 3/1893 | La Burt | ..................... | B61L 3/08 246/97 |
| 1,078,113 A * | 11/1913 | Williams | .............. | F16K 39/024 137/630.15 |
| 2,629,264 A * | 2/1953 | Kron | ...................... | F16K 31/05 16/431 |
| 2,808,144 A * | 10/1957 | Lambert | .................. | B41J 19/10 267/75 |
| 2,948,839 A * | 8/1960 | Smith, Jr. | ................ | G05D 3/14 318/610 |
| 3,033,477 A * | 5/1962 | Jeffrey | ..................... | D01H 1/36 242/478.5 |
| 3,106,504 A * | 10/1963 | Warne | ..................... | B29C 53/56 242/444 |
| 3,566,598 A * | 3/1971 | Godfrey | ................... | D01H 1/36 242/481 |
| 3,570,032 A * | 3/1971 | Allen | .................. | E02B 17/0854 405/199 |
| 4,898,362 A | 2/1990 | Leon et al. | | |
| 5,588,637 A * | 12/1996 | Carsten | ................... | F16K 31/05 251/129.13 |
| 5,735,456 A | 4/1998 | Marin et al. | | |
| 6,240,789 B1 * | 6/2001 | Morlan | .............. | F16K 37/0083 73/862.582 |

(Continued)

*Primary Examiner* — Edwin J Toledo-Duran

(57) ABSTRACT

A retrofitted flood irrigation valve apparatus, including a motor coupled to a stem of an existing flood irrigation valve, the motor to generate mechanical energy to rotate the stem of the existing flood irrigation valve and one or more rails coupled to a frame of the existing flood irrigation valve, wherein each of the one or more rails includes tracks along which the motor is configured to move as the stem of the existing flood irrigation valve opens and closes the valve.

20 Claims, 10 Drawing Sheets

(56) References Cited

U.S. PATENT DOCUMENTS

| | | | |
|---|---|---|---|
| 2005/0173663 A1* | 8/2005 | Wingett | F16K 31/06 |
| | | | 310/10 |
| 2010/0324744 A1 | 12/2010 | Cox | |
| 2012/0080563 A1* | 4/2012 | Gryniewski | B64G 5/00 |
| | | | 244/172.4 |
| 2012/0160199 A1* | 6/2012 | Dougherty | F01L 1/04 |
| | | | 123/90.26 |
| 2018/0266214 A1* | 9/2018 | Robinson | E21B 34/02 |
| 2021/0164183 A1* | 6/2021 | Wu | E02D 15/06 |
| 2021/0293343 A1 | 9/2021 | Chen et al. | |

* cited by examiner

RETROFITTED FLOOD IRRIGATION VALVE ACTUATING APPARATUS

CROSS-REFERENCE TO RELATED APPLICATIONS

This application is a continuation-in-part of U.S. patent application Ser. No. 17/215,825 filed Mar. 29, 2021, the entire contents of which are incorporated herein by reference.

TECHNICAL FIELD

Aspects and implementations of the present disclosure relate to flood irrigation valves and, in particular, a retrofitted flood irrigation valve actuating apparatus.

BACKGROUND

Flood irrigation refers to a form of irrigation in which water is applied and distributed over a soil surface by gravity. As water is applied to a top end of a field, the water flows over the length of the field, applying the water to the soil surface.

BRIEF DESCRIPTION OF THE DRAWINGS

Embodiments and implementations of the present disclosure will be understood more fully from the detailed description given below and from the accompanying drawings of various aspects and implementations of the disclosure, which, however, should not be taken to limit the disclosure to the specific embodiments or implementations, but are for explanation and understanding only.

DETAILED DESCRIPTION

Figure 1:
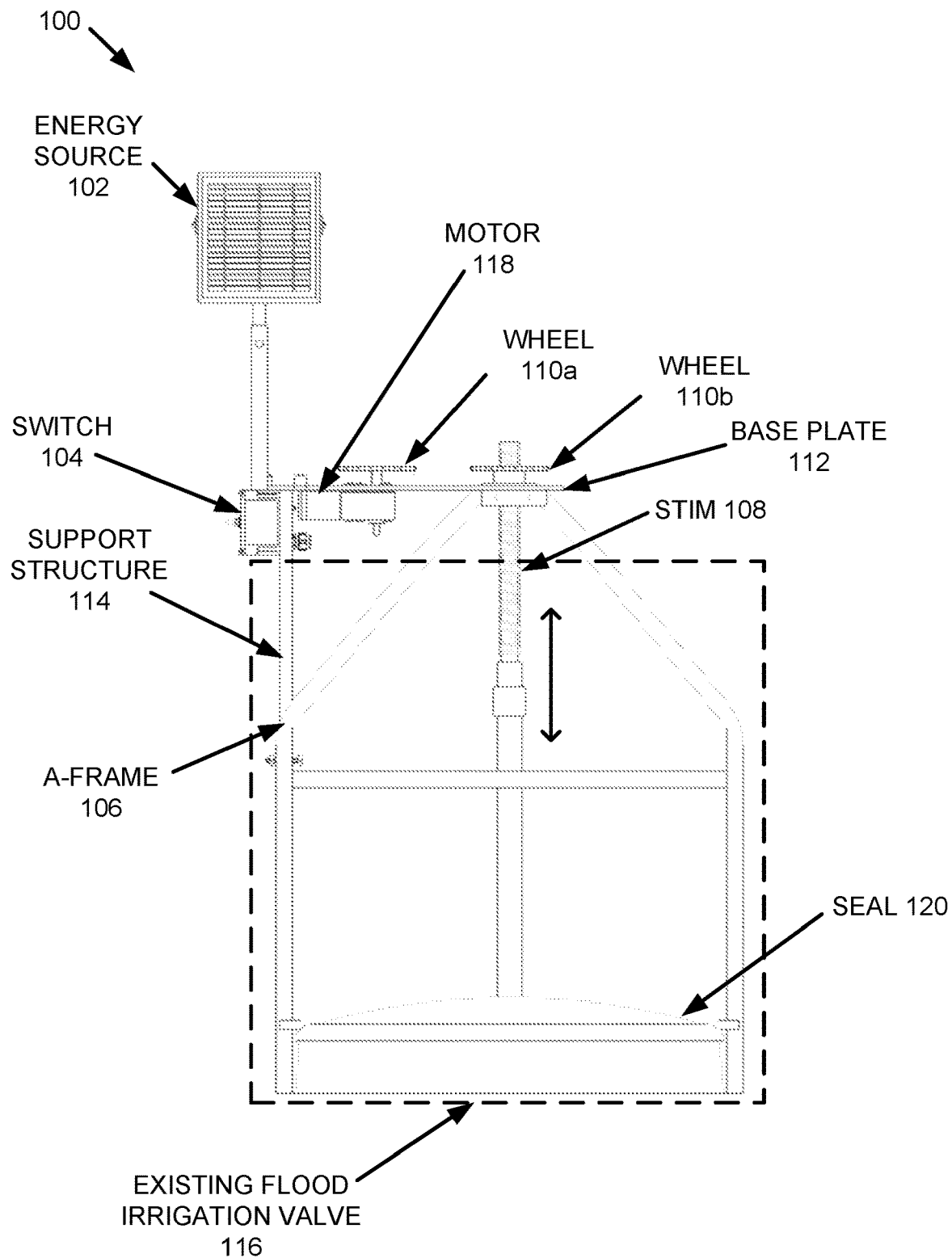
FIG. 1 illustrates an example configuration of a retrofitted flood irrigation valve apparatus coupled to an existing flood irrigation valve, in accordance with embodiments of the disclosure.

Aspects and implementations of the present disclosure are directed to a retrofitted flood irrigation valve actuating apparatus. The retrofitted flood irrigation valve actuating apparatus (also referred to as "apparatus" hereafter) may be used to automate the actuation of flood irrigation valves in a cost-effective manner.

Flood irrigation refers to a form of irrigation in which water is applied and distributed over a soil surface by gravity. As water is applied to a top end of a field, the water flows over the length of the field, applying the water to the soil surface. The field includes a number of flood irrigation valves which may be opened to permit the flow of water over corresponding sections of the field, or closed to seal the valve and prevent the flow of water.

In a conventional flood irrigation system, a user (e.g., a farmer) is required to manually open and close these valves in a particular order based on various factors, such as topography of the field, the surrounding environment, etc. The user is also required to manually monitor the water levels as the water is being applied over the soil surface, to ensure that sufficient moisture is being provided to the soil, while also not providing too much water to the soil. Once the proper amount of water has been provided to the section of the field, the user then manually closes the flood irrigation valve to stop the flow of water for that section of the field, and may repeat this process for the other valves of the field located at other sections of the field.

However, such a process is tedious and time consuming, requiring the user to travel to the various locations of their fields to manually actuate the flood irrigation valves. Furthermore, such a process may result in too much or too little water being provided to a field should the user fail to properly monitor the water level, resulting in an inefficient use of natural resources. This problem is of particular importance in agricultural areas which may experience droughts and the availability of fresh water is limited.

Conventional automated flood irrigation valves operate as standalone assemblies, and require a user to replace all their flood irrigation valves with the conventional automated flood irrigation valve assemblies. Having to replace all existing flood irrigation valves with the conventional automated flood irrigation valve assemblies is extremely cost prohibitive for most farmers, preventing these farmers from being able to automate the flood irrigation process.

Aspects of the disclosure remedy the above and other deficiencies by providing an automated flood irrigation valve actuating apparatus that can be retrofitted to an existing flood irrigation valve assembly. The apparatus may include a motor that provides mechanical energy to a first wheel. The first wheel may translate the mechanical energy generated by the motor to rotational motion. The rotational motion may be provided to a second wheel via a coupling. The apparatus may be retrofitted to the existing valve assembly by coupling an inner diameter of the second wheel to a stim of the existing flood irrigation valve. As the second wheel rotates, the second wheel may actuate (e.g., open or close) the flood irrigation valve based on the direction of the rotation of the second wheel.

By having the apparatus be retrofitted to the existing flood irrigation valve, the existing flood irrigation valve does not need to be removed and replaced with an automated flood irrigation valve assembly. This results in a cost-effective way to automate the flood irrigation process, while also reducing the amount of resources required to automate flood irrigation.

FIG. 1 illustrates an example configuration of a retrofitted flood irrigation valve apparatus 100 coupled to an existing flood irrigation valve, in accordance with embodiments of the disclosure. The apparatus 100 includes an energy source 102, a switch 104, a motor 118, wheel 110a, wheel 110b, base plate 112, and support structure 114.

The apparatus 100 may be retrofitted to an existing flood irrigation valve 116 by coupling the apparatus 100 to the existing flood irrigation valve 116. The existing flood irrigation valve 116 may include an A-frame 106, a seal 120, and a stim 108. The A-frame 106 may serve as an external support structure for the existing flood irrigation valve 116. The seal 120 may act as a water tight seal that prevents the release of water that resides below the existing flood irrigation valve 116. The stim 108 may be a threaded rod that causes the raising or lowering of seal 120 in a vertical direction by rotating the stim 108. For example, if the stim 108 is rotated in a counter-clockwise direction, then the seal 120 will be raised, opening the existing flood irrigation valve 116 and allowing the flow of water for flood irrigation. If the stim 108 is rotated in the clockwise direction, then the seal 120 will be lowered, closing the existing flood irrigation valve 116 and preventing the flow of water.

The energy source 102 may generate electrical energy that is provided to the motor 118. In some embodiments, the energy source 102 may include a solar panel that uses sunlight as a source of energy and generates electrical energy. In embodiments, the solar panel may be operatively coupled to a battery, which may store the electrical energy generated by the solar panel. In embodiments, the energy source 102 may include a fuel cell that converts the chemical energy of a fuel and an oxidizing agent into electrical energy. In an embodiment, the energy source 102 may include a generator, such as an internal combustion engine generator, that converts a fuel source into electrical energy. In some embodiments, the energy source 102 may include electrical energy generated by a power plant that is received via an electrical grid operatively coupled to the apparatus 100.

The electrical energy provided by the energy source 102 may be provided to a motor 118. The motor 118 may use the electrical energy provided by the energy source to generate mechanical energy. In embodiments, the motor 118 may include an electric motor. The wheel 110a may be operatively coupled to the motor 118 to translate the mechanical energy generated by the motor 118 into rotational motion. The rotational motion of wheel 110a may be provided to wheel 110b via a coupling (not shown), which causes wheel 110b to rotate.

In some embodiments, wheel 110a and wheel 110b may correspond to gears having protrusions that interface with a chain coupling to provide the rotational motion from wheel 110a to wheel 110b. In embodiments, wheel 110a and wheel 110b may correspond to pulleys that interface with a belt or tape coupling to provide the rotational motion from wheel 110b to wheel 110b. In an embodiment, wheel 110a and wheel 110b may interface with one another and the rotational motion may be provided from wheel 110a to wheel 110b without the use of a coupling.

The switch 104 may be operatively coupled to the motor 118. The switch 104 may transmit one or more signals to the motor 118 that cause the motor to generate mechanical energy that is provided to the wheel 110a. In embodiments, the one or more signals may indicate a direction of rotation for the motor 118. For example, the one or more signals may indicate whether the motor 118 is to operate in forward or reverse. In embodiments, the switch 104 may be operated manually by a user to cause the apparatus 100 to actuate the existing flood irrigation valve.

The base plate 112 may serve as a bottom surface of a housing of the apparatus 100. The base plate 112 may be formed of a rigid material, such as a metal, metallic alloy, or polymer, upon which wheel 110a, wheel 110b, motor 118, switch 104, support structure 114, and/or energy source 102 may be coupled to.

The support structure 114 may be coupled to the apparatus 100 and a surface of the A-frame 106 of the existing flood irrigation valve. The support structure 114 may be formed of a rigid material, such as a metal, metallic alloy, or polymer, and may support the weight of the components of the apparatus 100.

Figure 2:
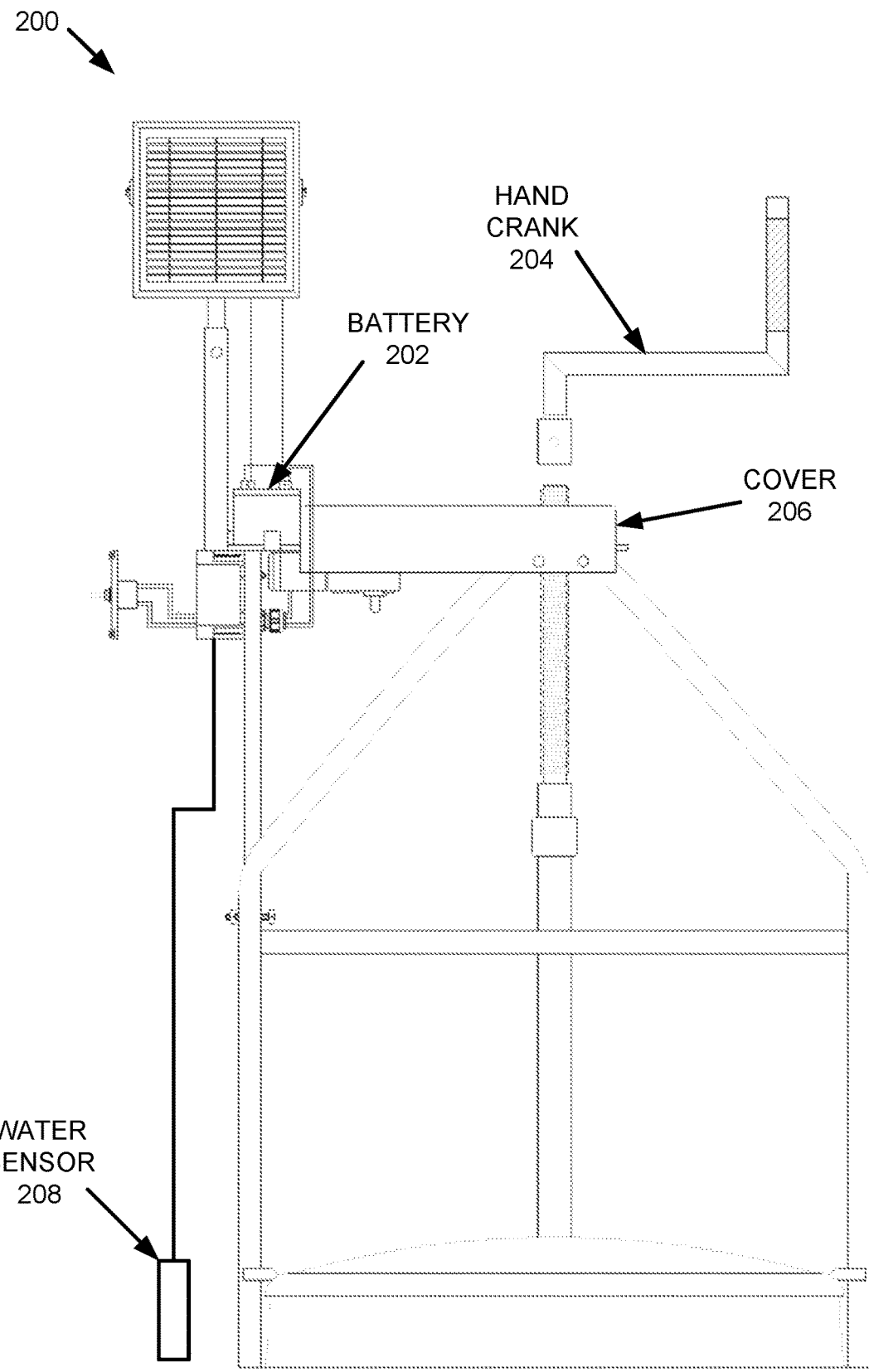
FIG. 2 illustrates an example configuration of a retrofitted flood irrigation valve apparatus, in accordance with embodiments of the disclosure.

FIG. 2 illustrates an example configuration of a retrofitted flood irrigation valve apparatus 200, in accordance with embodiments of the disclosure. The apparatus 200 may include the components of apparatus 100 previously described at FIG. 1. For clarity purposes, some of the components are not shown.

The apparatus 200 may include a battery 202 that is operatively coupled to the energy source, the switch, and/or the motor of the apparatus 200. The battery 202 may store electrical energy that may be used to operate the switch and/or motor of the apparatus 200. The apparatus may include a cover 206 that is detachably coupled to the base plate (not shown) of the apparatus 200 to form the upper section of the housing of the apparatus 200. The cover 206 may be formed of a rigid material, such as a metal, metallic allow, or polymer.

The apparatus 200 may include a water sensor 208 that is operatively coupled to the switch of the apparatus. The water sensor 208 may transmit signals to the switch that correspond to a water level of the field that is being irrigated by the flood irrigation valve. In embodiments, the switch may close the flood irrigation valve upon the signals from the water sensor 208 indicating that the water level has reached a particular value.

In embodiments, a hand crank 204 may be detachably coupled to a top portion of the stim that protrudes through an opening in the cover 206 of the housing of apparatus 200. The hand crank 204 may allow a user to manually open or close the flood irrigation valve in the event that the apparatus is rendered inoperable. For example, if the apparatus 200 does not have sufficient electrical energy to drive the motor or in the event of a mechanical failure, the user may use the hand crank 204 to manually actuate the flood irrigation valve.

Figure 3:
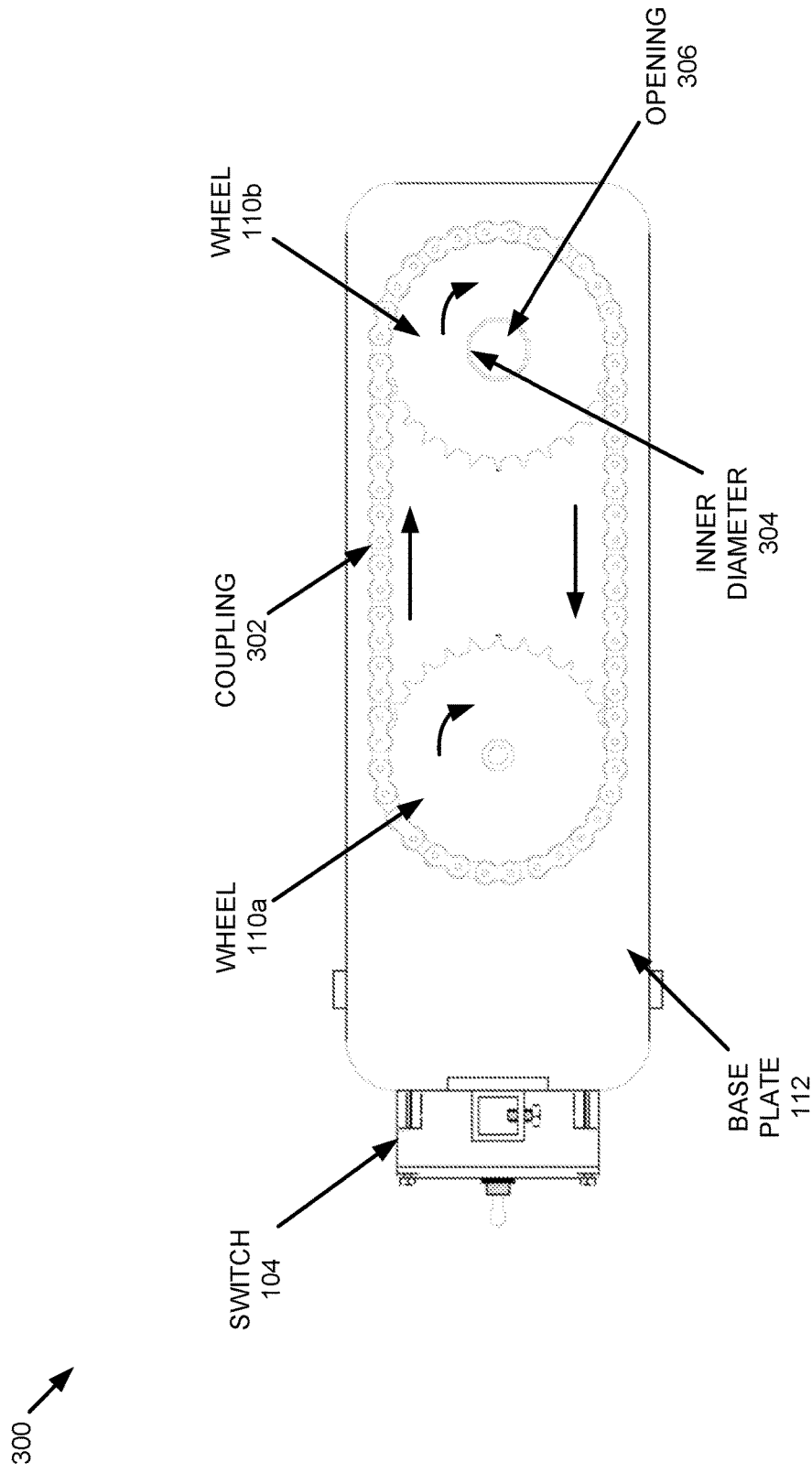
FIG. 3 illustrates a top-down view of an example of a retrofitted flood irrigation valve apparatus, in accordance with embodiments of the disclosure.

FIG. 3 illustrates a top-down view of an example of a retrofitted flood irrigation valve apparatus 300, in accordance with embodiments of the disclosure. FIG. 3 depicts a top-down view of the apparatus 300 with the cover removed for clarity. The apparatus 300 includes switch 104, wheel 110a, wheel 110b, and base plate 112, as previously described. For illustrative purposes, other components of the apparatus 300 may not be shown.

The apparatus 300 includes a coupling 302 that is coupled to wheel 110a and wheel 110b. As previously described, the coupling 302 may provide rotational motion of wheel 110a to wheel 110b. In FIG. 3, wheel 110a and wheel 110b are illustrated as gears and coupling 302 is illustrated as a chain. The protrusions on wheels 110a and wheel 110b interface with the links in coupling 302, such that when wheel 110a rotates, the coupling 302 moves. The movement of coupling 302 is provided to wheel 110*b*, causing wheel 110*b* to rotate.

As previously described, wheel 110*b* may include an opening 306 having an inner diameter 304. The apparatus 300 may be coupled to an existing flood irrigation valve such that the stim (not shown) of the existing flood irrigation valve is coupled to the inner diameter 304 of the opening 306 of wheel 110*b*. Because the stim of the existing flood irrigation valve is threaded, the rotation of the wheel 110*b* that is coupled to the stim may actuate (e.g. open or close) the existing flood irrigation valve as the rotation of the stim will cause the seal of the existing flood irrigation valve to raise or lower based on the direction of the rotation.

In some embodiments, the surface of the inner diameter 304 may be threaded to interface with the threads on the stim of the existing flood irrigation valve. For example, the surface of the inner diameter may use the same or similar thread standard as the thread standard of the stim of the existing flood irrigation valve. In some embodiments, rather than the surface of inner diameter 304 being threaded, a threaded sleeve may be inserted into the opening 306 of the wheel 110*b* to interface with the stim of the existing flood irrigation valve.

Figure 4:
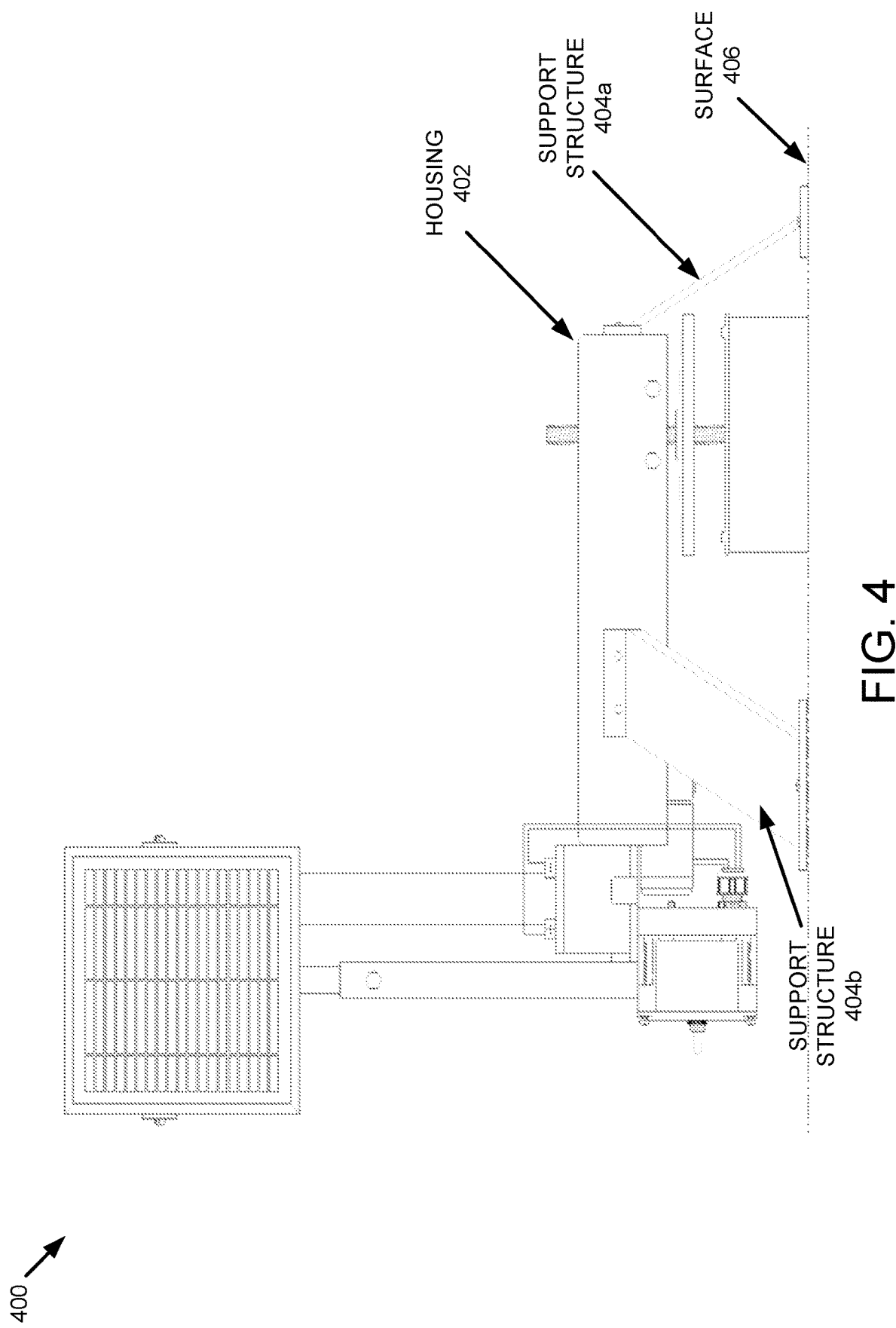
FIG. 4 is an illustration of an example of a retrofitted flood irrigation valve apparatus having multiple support structures, in accordance with embodiments of the disclosure.

FIG. 4 is an illustration of an example of a retrofitted flood irrigation valve apparatus 400 having multiple support structures, in accordance with embodiments of the disclosure. In some embodiments, an existing flood irrigation valve may not include an external support structure, such as an A-frame, that the apparatus 400 can be coupled to. To support the weight of the apparatus, multiple support structures (e.g., support structure 404*a* and support structure 404*b*) may be coupled to the housing 402 of the apparatus and a surface 406. Support structure 404*a* and support structure 404*b* may be formed of a rigid material, such as a metal, metallic alloy, or polymer. In some embodiments, support structure 404*a* and support structure 404*b* may be coupled to the housing 402 using threaded couplings, such as bolts or screws. In embodiments, support structure 404*a* and support structure 404*b* may be welded or brazed to housing 402. In some embodiments, support structure 404*a* and support structure 404*b* may be telescoping to extend or retract to various lengths to enable the apparatus 400 to be positioned at various heights or on uneven terrain/surfaces. Although two support structures are illustrated in FIG. 4, in embodiments the apparatus 400 may include any number of support structures.

Figure 5:
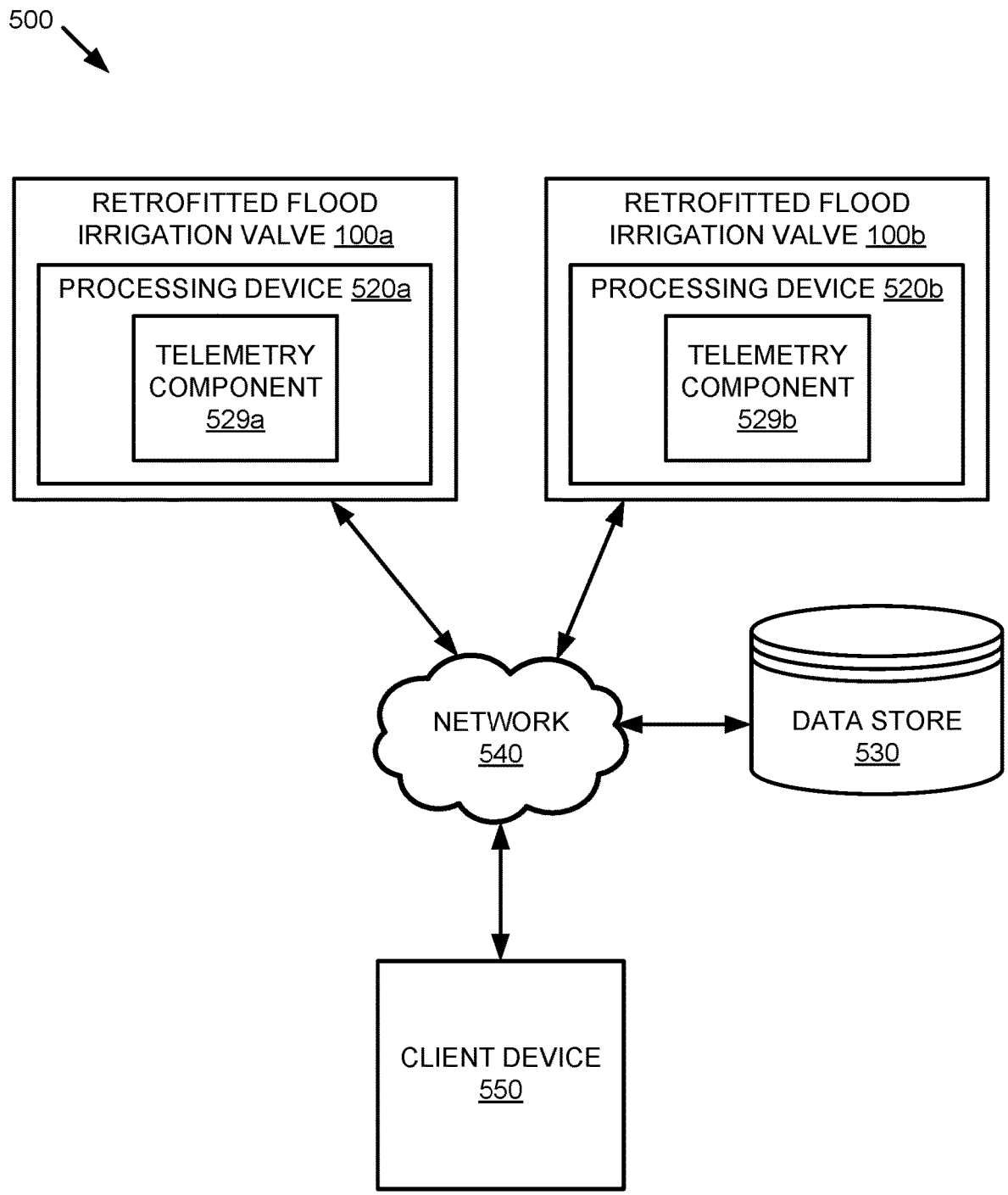
FIG. 5 is a block diagram that illustrates an example of a telemetry system, in accordance with an embodiment of the present disclosure.

FIG. 5 is a block diagram that illustrates an example of a telemetry system 500, in accordance with an embodiment of the present disclosure. The telemetry system 500 may include retrofitted flood irrigation valve apparatuses 100*a, b*, as previously described at FIGS. 1-4 and retrofitted flood irrigation valve apparatus 700 or 800, described below. In embodiments, the apparatuses 100*a, b*, 700 or 800 may include processing devices 520*a, b*, respectively. Processing devices 520*a, b* each represent one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing devices 520*a, b* may also be one or more special-purpose processing devices such as an application specific integrated circuit (ASIC), a field programmable gate array (FPGA), a digital signal processor (DSP), network processor, or the like. In embodiments, processing devices 520*a, b* may execute telemetry components 529*a, b*, respectively, to facilitate communication using the telemetry system 500. Processing devices 520*a, b* may be operatively coupled to the switches, sensors, and/or motors of their respective apparatuses and may control the operation of the apparatuses.

In embodiments, apparatuses 100*a, b*, 700 and 800 may be operatively coupled to a data store 530 and a client device 550 via a network 540. In some embodiments, the data store 530 may reside in apparatus 100*a* and/or apparatus 100*b*.

The network 540 may be a public network (e.g., the internet), a private network (e.g., a local area network (LAN) or wide area network (WAN)), or a combination thereof. In one embodiment, network 540 may include a wired or a wireless infrastructure, which may be provided by one or more wireless communications systems, such as a WiFi™ hotspot connected with the network 540 and/or a wireless carrier system that can be implemented using various data processing equipment, communication towers (e.g. cell towers), etc.

The client device 550 may be a computing device, such as a personal computer, laptop, cellular phone, personal digital assistant (PDA), gaming console, tablet, etc.

The data store 530 may be a persistent storage that is capable of storing data associated with a flood irrigation system. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices.

In embodiments, data store 530 may be a central server or a cloud-based storage system including a processing device (not shown). The central server or the cloud-based storage system may be accessed by apparatuses 100*a, b* and/or client device 550. In some embodiments, one or more commands may be provided to the apparatuses 100*a, b* by client device 550 via network 540. For example, the client device 550 may transmit a command to processing device 520*a* of apparatus 100*a* to open the flood irrigation valve that apparatus 100*a* is coupled to. The processing device 520*a* may then transmit one or more signals to the switch and/or motor of the apparatus 100*a* to cause the motor to generate mechanical energy, which is used to open the flood irrigation valve, as previously described.

In some embodiments, apparatuses 100*a, b*, 700, and 800 may transmit one or more commands to one another via network 540. In embodiments, the one or more commands that are transmitted may correspond to a flood irrigation process. For example, a flood irrigation process may indicate that a first flood irrigation valve that apparatus 100*a* is coupled to is to be opened to irrigate a first section of a field. Once the first section of the field has been irrigated, the first flood irrigation valve is to be closed and a second flood irrigation valve that apparatus 100*b* is coupled to is to be opened to irrigate a second section of a field. In embodiments, to perform the flood irrigation process, the apparatus 100*a* may open the first flood irrigation valve to irrigate the first section of the field. Upon irrigation of the first section of the field, the apparatus 100*a* may close the valve and transmit a command to apparatus 100*b* via network 540, indicating that apparatus 100*b* is to open the second flood irrigation valve. Upon receipt of the command, apparatus 100*b* may open the second irrigation valve. This process may be performed iteratively using any number of apparatuses coupled to any number of flood irrigation valves to complete flood irrigation of one or more fields of land.

Figure 6:
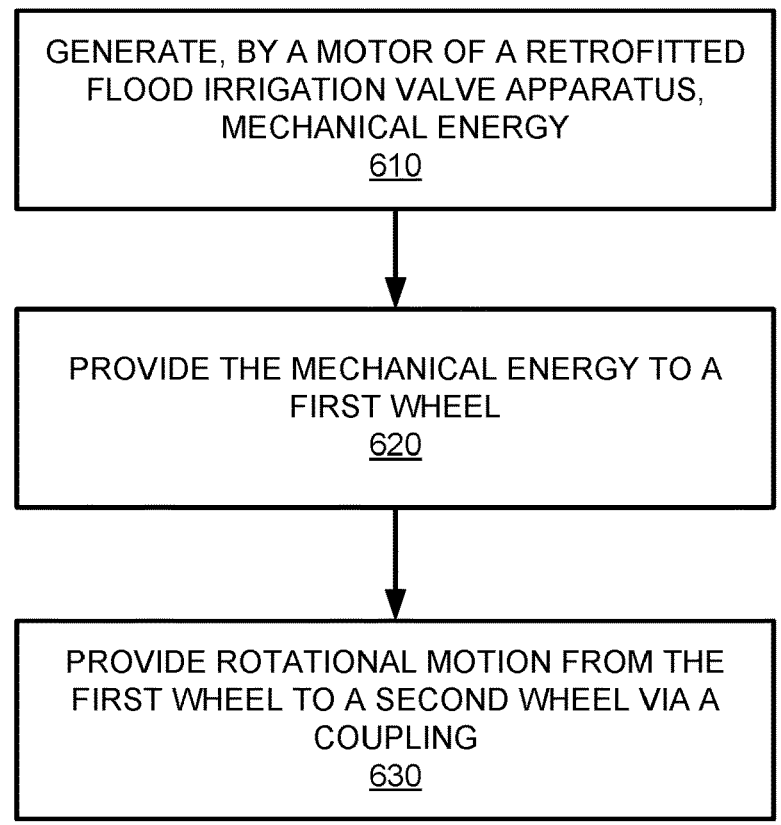
FIG. 6 depicts a flow diagram of a method of utilizing a retrofitted flood irrigation valve actuating apparatus, in accordance with implementations of the present disclosure.

FIG. 6 depicts a flow diagram of a method 600 of utilizing a retrofitted flood irrigation valve actuating apparatus, in accordance with implementations of the present disclosure. In embodiments, various portions of method 600 may be performed by apparatus 100, 200, 300, and/or 400 of FIGS. 1-4.

With reference to FIG. 6, method 600 illustrates example functions used by various embodiments. Although specific function blocks ("blocks") are disclosed in method 600, such blocks are examples. That is, embodiments are well suited to performing various other blocks or variations of the blocks recited in method 600. It is appreciated that the blocks in method 600 may be performed in an order different than presented, and that not all of the blocks in method 600 may be performed.

At block 610, a motor of the apparatus generates mechanical energy.

At block 620, the motor of the apparatus provides the mechanical energy to a first wheel of the apparatus. The first wheel may translate the mechanical energy generated by the motor into rotational motion.

At block 630, a coupling provides the rotational motion from the first wheel to a second wheel. The rotational motion at the second wheel may cause the second wheel to actuate an existing flood irrigation valve that the apparatus is to be coupled to, as previously described.

Figure 7:
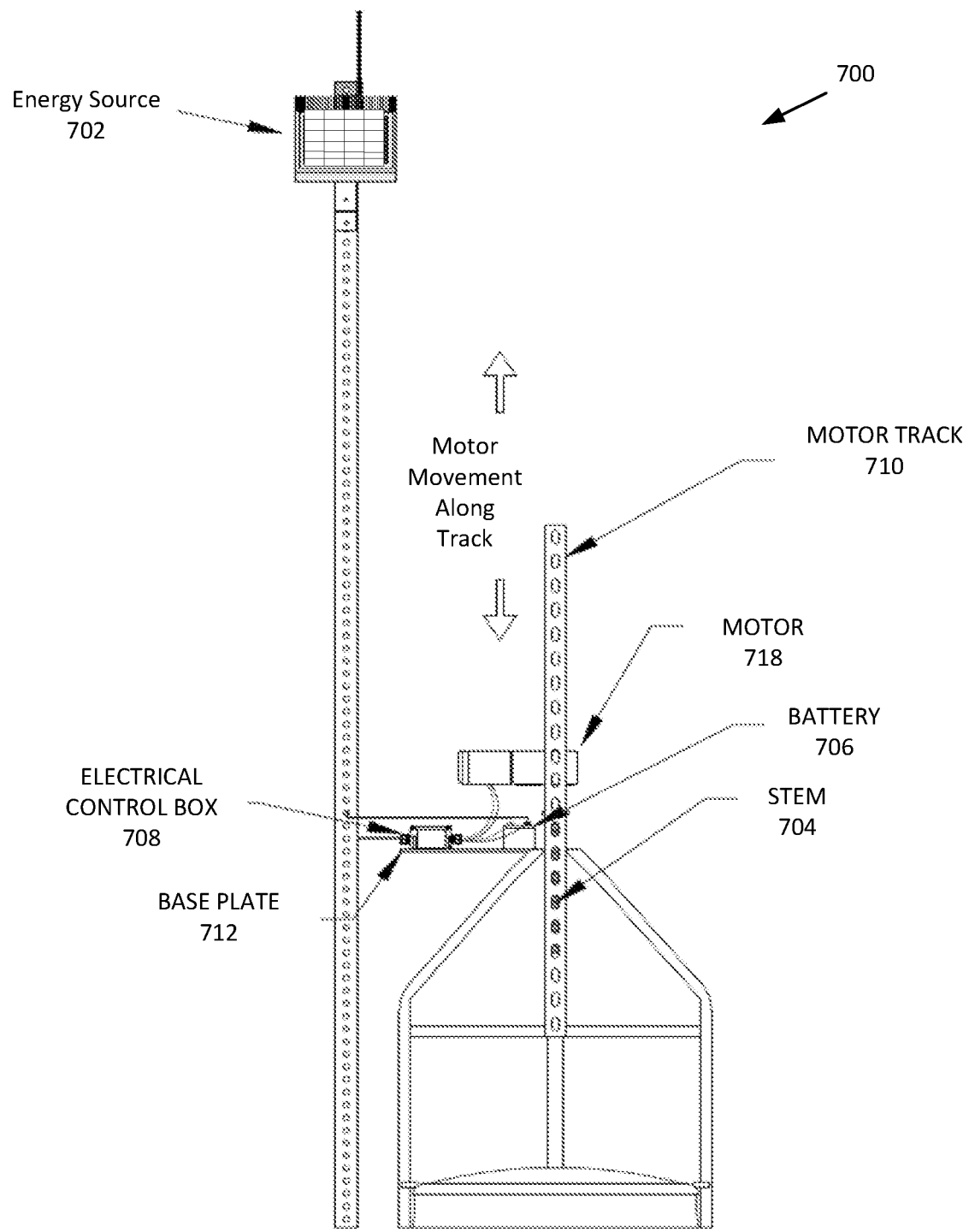
FIG. 7 is an illustration of another example of a retrofitted flood irrigation valve with a motor coupled directly to the valve stem of an existing irrigation valve, in accordance with embodiments of the disclosure.
Figure 9:
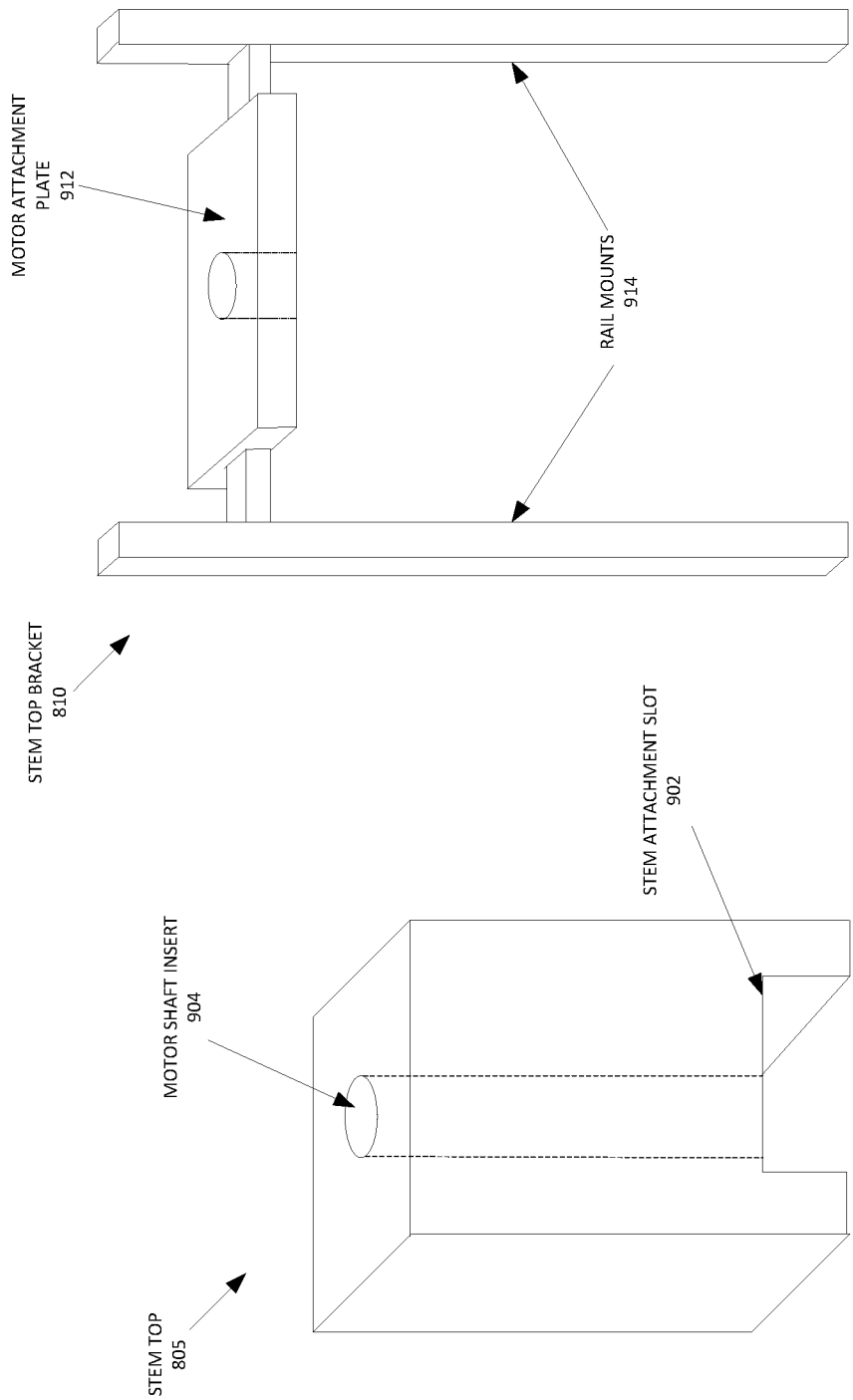
FIG. 9A is an illustration of an example coupling mechanism for coupling a motor to an existing irrigation valve, in accordance with embodiments of the disclosure.
FIG. 9B is an illustration of an example coupling mechanism for coupling a motor to an existing irrigation valve, in accordance with embodiments of the disclosure.

FIG. 7 is an illustration of another example of a retrofitted flood irrigation valve 700 with a motor coupled directly to the valve stem of an existing irrigation valve, in accordance with embodiments of the disclosure. Similar to FIG. 1, the retrofitted flood irrigation valve 700 includes an energy source 702 and a motor 718 to generate mechanical energy. However, the retrofitted flood irrigation valve 700 provides for direct coupling of the motor 718 to the stem 704 of an existing irrigation valve. For example, the drive shaft of the motor 718 may be coupled to the stem 704 (e.g., via attachment mechanisms described in further detail below with respect to FIG. 9A). Accordingly, the motor 718 provides direct rotation to the stem 704 of the existing irrigation valve.

To support the position of the motor 718 as attached to the stem 704, the retrofitted flood irrigation valve 700 may include one or more motor tracks 710 that extend vertically along the direction of the stem 704. The motor tracks 710 may be coupled to a frame of the existing irrigation valve or may be coupled to a structure that is separate or external to the existing irrigation valve. As the motor rotates the stem 704 to open or close the irrigation valve, the motor may slide along the motor tracks 710 along with the stem 704 and valve. Thus, the motor 718 maintains attachment to the stem 704 as the stem and valve move up and down during opening and closing of the valve. Additionally, the retrofitted flood irrigation valve 700 may include a base plate 712 to support an electrical control box 708 for controlling the motor. The base plate 712 may also support a battery 706 and any other circuitry for powering and operating the motor, such as communication, connectivity, and networking equipment for remote control and communication with the retrofitted flood irrigation valve 700.

Figure 8:
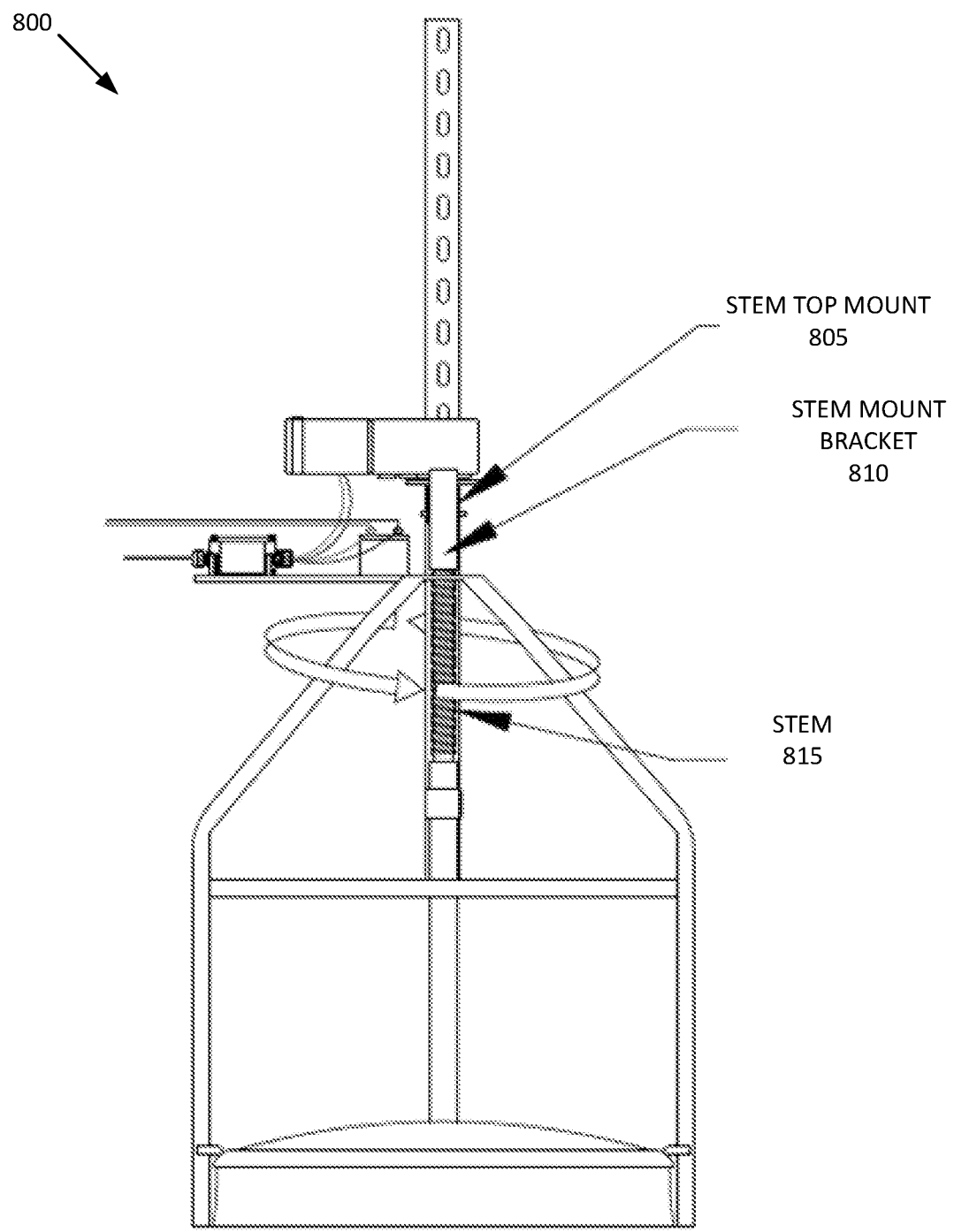
FIG. 8 is another illustration of an example of a retrofitted flood irrigation valve with a motor coupled directly to the valve stem of an existing irrigation valve, in accordance with embodiments of the disclosure.

FIG. 8 is another illustration of an example of a retrofitted flood irrigation valve 800 with a motor coupled directly to the valve stem of an existing irrigation valve, in accordance with embodiments of the disclosure. As depicted in FIG. 8, a motor (e.g., motor 718 of FIG. 7) is attached to the stem 815 of a flood irrigation valve via a stem top mount 805 (further describes with respect to FIG. 9A). The stem top mount 805 may be attached to a drive shaft of the motor via one or more attachment mechanisms such as screws, adhesive, bolts, clips, pins or the like that can securely attach the stem top mount 805 to the drive shaft to provide rotation to the stem top mount 805. The stem top mount 805 may further be attached to the top of the stem 815 via similar or different attachment mechanisms such as screws, bolts, pins, welding, etc. Thus, the stem top mount 805 may allow the motor to transfer rotation energy to the stem 815, rotating the stem and its threads to open or close the irrigation valve. Furthermore, the motor may be attached to a stem mount bracket 810 (further describes with respect to FIG. 9B) that is configured to slide vertically along tracks of one or more rails (e.g., motor tracks 710) as the motor and stem rises and falls when opening and closing the irrigation valve. In some examples, a driveshaft of the motor extends through a motor mounting plate of the stem top bracket and the stem top mount is attached to the driveshaft of the motor on the other side of the motor mounting plate.

FIG. 9A is an illustration of an example stem top coupling mechanism 805 for coupling a motor to a stem of an existing irrigation valve, in accordance with embodiments of the disclosure. The stem top 805 may include a motor shaft insert 904 into which a drive shaft of a motor can be inserted for attachment. In some examples, the step top 805 is attached to the drive shaft of the motor via a collar and screws. In some examples, the drives shaft is attached via one or more bolts, pins, or other mechanism securing the stem top 805 to the drive shaft of the motor to provide rotation to stem top 805. The stem top 805 may further include a stem attachment slot 902 in which the stem of an existing irrigation valve can be inserted and securely attached. Once inserted in the stem attachment slot 902 the stem may be attached to the stem top 805 via any attachment mechanism such as bolts, screws, collars, welding, etc. In some examples, the attachment mechanism is removable allowing the stem top 805 to be attached or detached from both the motor and the stem as needed. It should be noted that the structure of the stem top 805 may vary from the depicted geometry. For example, the stem top 805 may be cylindrical, hexagonal, octagonal or any other shape proving an attachment to the drive shaft at one end and the stem at the other. Additionally, the stem attachment slot 902 may alternatively be an insert (e.g., a cylindrical hole with a larger diameter than the motor shaft insert 904) or any other recess to provide an attachment position and rotational leverage (e.g., torque) about the stem of an irrigation valve.

FIG. 9B is an illustration of an example stem top bracket 810 coupling mechanism for coupling a motor to tracks in a retrofitted flood irrigation valve, in accordance with embodiments of the disclosure. The stem top bracket 810 may include a motor attachment plate 912 to which a motor can be mounted. The motor attachment plate 912 may include a hole through which the drive shaft of the motor can extend (e.g., to then be attached to the stem top 805 of FIG. 9A). The stem top bracket 810 further includes one or more rail mounts 914 that can be inserted into tracks of vertical rails attached to an irrigation valve. Accordingly, the stem top bracket 810 allows the motor to travel along the direction of the rails as the flood irrigation valve is opened and closed. Although depicted as having two rails mounts 914, the stem top bracket 810 may also include one rail mount to be inserted into the tracks of a single rail, three rail mounts, or any useful number of rail mounts to allow the motor freedom to slide along the vertical direction with the opening or closing valve and stem.

Figure 10:
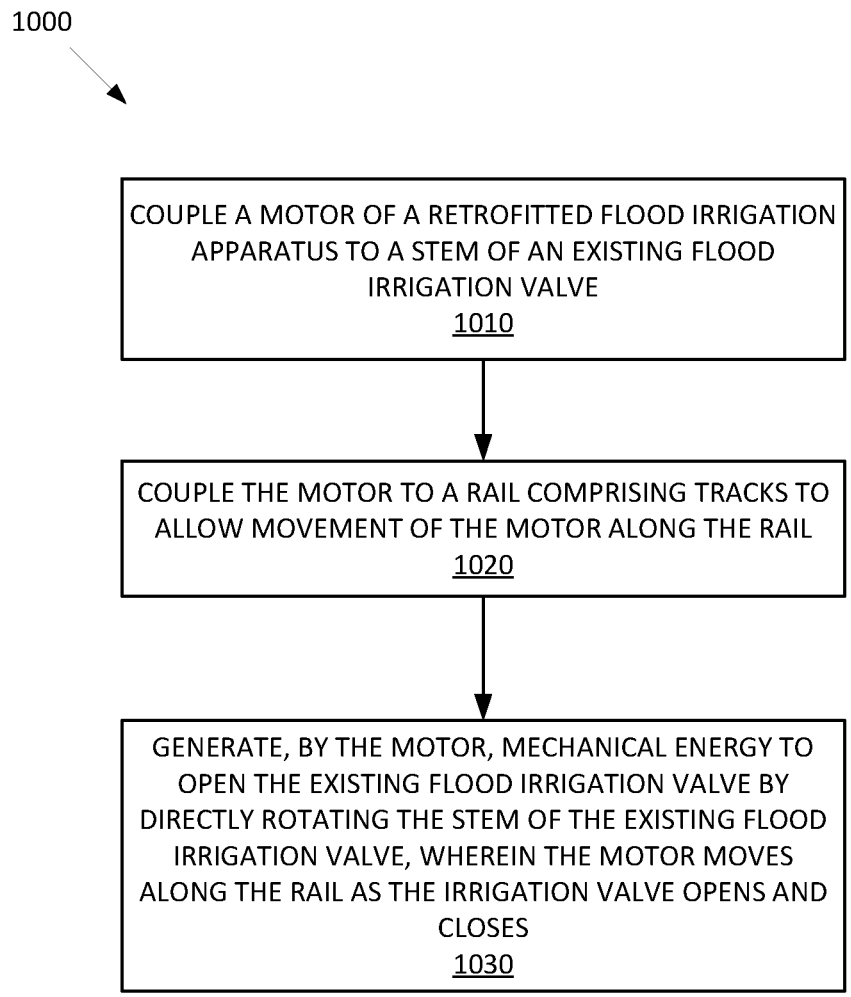
FIG. 10 depicts a flow diagram of a method of utilizing a retrofitted flood irrigation valve actuating apparatus coupled to a stem of an existing irrigation valve, in accordance with embodiments of the disclosure.

FIG. 10 depicts a flow diagram of a method 1000 of utilizing a retrofitted flood irrigation valve actuating apparatus coupled to a stem of an existing irrigation valve, in accordance with embodiments of the disclosure. In embodiments, various portions of method 1000 may be performed by apparatus 100, 200, 300, 400, 700, 800, and 900A-B of FIGS. 1-4 and 7-9B.

With reference to FIG. 10, method 1000 illustrates example functions used by various embodiments. Although specific function blocks ("blocks") are disclosed in method 1000, such blocks are examples. That is, embodiments are well suited to performing various other blocks or variations of the blocks recited in method 1000. It is appreciated that the blocks in method 1000 may be performed in an order different than presented, and that not all of the blocks in method 1000 may be performed.

At block 1010, a motor of a retrofitted flood irrigation apparatus is coupled to a stem of an existing food irrigation valve.

At block 1020, the motor is coupled to rails including tracks to allow moving of the motor along the rail.

At block 1030, the motor generates mechanical energy to open the existing flood irrigation valve by directly rotating the stem of the existing flood irrigation valve, wherein the motor moves along the rail as the irrigation valve opens and closes. In some examples, a processing device of the retrofitted flood irrigation valve apparatus transmits one or more signals to actuate the motor, wherein the motor generates the mechanical energy upon receiving the one or more signals. In some examples, the processing device receives a command from a client device via a network to actuate the existing flood irrigation valve and transmit the one or more signals to actuate the motor based on the command.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A retrofitted flood irrigation valve apparatus, comprising:
   a motor coupled to a stem of an existing flood irrigation valve that is previously installed, the motor to generate mechanical energy to rotate the stem of the existing flood irrigation valve; and
   one or more rails coupled to a frame of the existing flood irrigation valve, wherein each of the one or more rails comprises tracks, arranged parallel to the stem of the existing flood irrigation valve, along which the motor is configured to move as the stem of the existing flood irrigation valve opens and closes the valve.

2. The retrofitted flood irrigation valve apparatus of claim 1, further comprising:
   a stem top mount to couple a drive shaft of the motor to the top of the stem of the existing flood irrigation valve.

3. The retrofitted flood irrigation valve apparatus of claim 1, further comprising:
   a bracket comprising a motor mount plate and one or more rail mounts to couple the motor to the one or more rails, wherein the motor is attached to the motor mount plate and the one or more rails mounts are inserted into the tracks of the one or more rails.

4. The retrofitted flood irrigation valve apparatus of claim 1, further comprising:

a switch operatively coupled to the motor, the switch to transmit one or more signals to the motor to cause the motor to generate the mechanical energy.

5. The retrofitted flood irrigation valve apparatus of claim 1, further comprising:

a processing device operatively coupled to the motor, the processing device to transmit one or more signals to the motor to cause the motor to generate the mechanical energy.

6. The retrofitted flood irrigation valve apparatus of claim 5, wherein the processing device is to receive a command from a client device via a network to actuate the existing flood irrigation valve and transmit the one or more signals to the motor to generate the mechanical energy based on the command.

7. The retrofitted flood irrigation valve apparatus of claim 5, wherein the processing device is to transmit, to a second processing device of a second retrofitted flood irrigation valve apparatus, a command to cause the second processing device to actuate a second exiting flood irrigation valve coupled to the second retrofitted flood irrigation valve apparatus.

8. The retrofitted flood irrigation valve apparatus of claim 1, further comprising:

an energy source coupled to the motor, wherein the energy source generates electrical energy that is provided to the motor, wherein the motor generates the mechanical energy using the electrical energy.

9. The retrofitted flood irrigation valve apparatus of claim 8, wherein the energy source comprises a solar panel and a battery.

10. The retrofitted flood irrigation valve apparatus of claim 8, wherein the energy source comprises a generator.

11. The retrofitted flood irrigation valve apparatus of claim 8, wherein the energy source comprises a fuel cell.

12. The retrofitted flood irrigation valve apparatus of claim 1, further comprising:

a water sensor to monitor a water level of a field associated with the existing flood irrigation valve.

13. The retrofitted flood irrigation valve apparatus of claim 1, wherein the one or more rails are mounted to a frame of the existing flood irrigation valve.

14. The retrofitted flood irrigation valve apparatus of claim 1, further comprising:

a stem top bracket attached to the motor, wherein a driveshaft of the motor extends through a motor mounting plate of the stem top bracket; and a stem top mount attached to the driveshaft of the motor, wherein the stem top mount is attached on a side of the motor mounting plate opposite the motor.

15. The retrofitted flood irrigation valve apparatus of claim 1, wherein the motor comprises an electric motor.

16. The retrofitted flood irrigation valve apparatus of claim 1, further comprising:

an electrical control box to control the motor; and a base plate to hold the electrical control box.

17. A method of utilizing a retrofitted flood irrigation valve apparatus, comprising:

coupling a motor of a retrofitted flood irrigation apparatus to a stem of an existing flood irrigation valve that is previously installed;

coupling the motor to a at least one rail comprising tracks, arranged parallel to the stem of the existing flood irrigation valve, to allow movement of the motor along the at least one rail; and generating, by the motor, mechanical energy to open the existing flood irrigation valve by directly rotating the stem of the existing flood irrigation valve, wherein the motor moves along the rail as the existing flood irrigation valve opens and closes.

18. The method of utilizing the retrofitted flood irrigation valve apparatus of claim 17, wherein the motor is coupled to the stem of the existing flood irrigation valve by a stem top mount comprising a motor shaft insert and a stem attachment slot.

19. The method of utilizing the retrofitted flood irrigation valve apparatus of claim 17, further comprising:

transmitting, by a processing device of the retrofitted flood irrigation valve apparatus, one or more signals to actuate the motor, wherein the motor generates the mechanical energy upon receiving the one or more signals.

20. The method of utilizing the retrofitted flood irrigation valve apparatus of claim 19, further comprising:

receiving, by the processing device, a command from a client device via a network to actuate the existing flood irrigation valve and transmit the one or more signals to actuate the motor based on the command.

* * * * *